United States Patent
Mikkelsen et al.

(10) Patent No.: US 6,985,237 B2
(45) Date of Patent: Jan. 10, 2006

(54) METHOD FOR DETERMINING LAYER THICKNESS RANGES

(75) Inventors: Hakon Mikkelsen, Göttingen (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 239 days.

(21) Appl. No.: 10/462,280

(22) Filed: Jun. 16, 2003

(65) Prior Publication Data

US 2004/0130726 A1    Jul. 8, 2004

(30) Foreign Application Priority Data

Jun. 20, 2002    (DE) ................. 102 27 376

(51) Int. Cl.
*G01B 11/02*    (2006.01)
(52) U.S. Cl. .................................... 356/504
(58) Field of Classification Search ........... 356/451, 356/503, 504, 630, 632; 250/559.27, 559.28
See application file for complete search history.

(56) References Cited

U.S. PATENT DOCUMENTS

| | | | |
|---|---|---|---|
| 5,493,401 A * | 2/1996 | Horie et al. ............ | 356/632 |
| 5,724,145 A * | 3/1998 | Kondo et al. ........... | 356/632 |
| 5,866,917 A * | 2/1999 | Suzuki et al. .......... | 250/559.27 |
| 6,081,334 A * | 6/2000 | Grimbergen et al. .... | 356/499 |
| 6,172,756 B1 * | 1/2001 | Chalmers et al. ....... | 356/630 |

FOREIGN PATENT DOCUMENTS

DE    10021379 A1    11/2001

OTHER PUBLICATIONS

Stenzel, Olaf, "Das Dunnschicht-spektrum," Akademie Verlag, pp. 77-80.
Hauge, P.S., *"Polycrystalline Silicon Film Thickness Measurement from Analysis of Visible Reflectance Spectra,"* J. Opt. Soc. Am., vol. 69, No. 8, Aug. 1979, pp. 1143-1152.
Thompkins, Harland G. and McGahan, William A., *"Spectroscopic Ellipsometry and Reflectometry,"* pp. 90-91.

\* cited by examiner

*Primary Examiner*—Gregory Toatley, Jr.
*Assistant Examiner*—Michael A. Lyons
(74) *Attorney, Agent, or Firm*—Houston Eliseeva LLP

(57) ABSTRACT

The invention concerns a method for the determination of layer thickness ranges of layers of a specimen, in which the reflection spectrum of the specimen is measured in a specified wavelength range and then smoothed, the number of extremes in the smoothed reflection spectrum is determined, and the determination of the layer thickness ranges is accomplished by comparison with the number of extremes in the modeled reflection spectra, such that for each layer the thickness in that layer is varied in steps having a predetermined increment, and a reflection spectrum is modeled. In a method of this kind, the wavelength range and the increments are specified in self-consistent fashion using a sensitivity criterion.

2 Claims, 4 Drawing Sheets

METHOD FOR DETERMINING LAYER THICKNESS RANGES

CROSS REFERENCE TO RELATED APPLICATIONS

This application claims priority of the German patent application 102 27 376.6 which is incorporated by reference herein.

FIELD OF THE INVENTION

The invention concerns a method for determining layer thickness ranges of layers of a specimen, in which the reflection spectrum of the specimen is measured in a specified wavelength range and then smoothed, the number of extremes in the smoothed reflection spectrum is determined, and the determination of the layer thickness ranges is accomplished by comparison with the number of extremes in the modeled reflection spectra, such that for each layer the thickness in that layer is varied in steps having a predetermined increment, and a reflection spectrum is modeled; and refers to the problem of determining layer thickness ranges in multiple-layer systems.

BACKGROUND OF THE INVENTION

Reflection spectroscopy is a method for investigating layer systems that is widespread and has been used for some time. In the manufacture of semiconductor chips, for example, semiconductor wafers are coated with thin layers. For reasons of quality control, it is then desirable to determine the thickness of those layers without damaging the semiconductor wafer. Such investigations can be performed, for example, using reflection spectroscopy. The principle of this method is very simple: a specimen having multiple layers is irradiated with light of a specified wavelength. If the layers are transparent, the light penetrates into the layers and is partially reflected in the transition regions between two layers (also including the transition between the topmost layer and the surrounding atmosphere). Superposition of the incident and reflected light results in interferences, thus influencing the intensity of the reflected light. The ratio between the intensities of the incident and reflected light determines the so-called absolute reflectance; both intensities therefore need to be measured. If the wavelength is then varied continuously within a specified range, the reflection spectrum is then obtained; this exhibits, as a function of wavelength, maxima and minima that are caused by the interferences. The locations of these extremes depend on the material properties of the specimen which determine its optical behavior, including especially the thicknesses of the individual layers.

It is possible in principle to deduce the layer thicknesses from the measured reflection spectrum. In an ideal model, the limits in terms of the thickness of the layers and their quantity are extremely broad. The underlying formulae can be derived from Fresnel diffraction theory, as described in detail in the article by P. S. Hauge, "Polycrystalline silicon film thickness measurement from analysis of visible reflectance spectra" in J. Opt. Soc. Am., Vol. 69 (8), 1979, pp. 1143–1152. As is evident from the book by O. Stenzel, "Das Dünnschichtspektrum" (The thin-layer spectrum), Akademieverlag 1996, pp. 77–80, however, determining the optical constants and layer thicknesses by back-calculation is in reality very difficult and laborious, since the number of unknowns is very large.

Regardless of the model and approximations used, a determination of layer thicknesses generally proceeds in the following manner for a system having multiple layers: For each layer, a reflection spectrum is modeled in a specified wavelength range for layer thickness values that lie, spaced apart by a specified increment, between a minimum and a maximum value. The thicknesses of the other layers are each kept constant. Using this first coarse search method, it is possible to determine the ranges within which the layer thicknesses of the individual layers can lie, by (in simplified terms) comparing the numbers of extremes in the measured and in the modeled reflection spectrum. If those numbers deviate from one another by more than a specified difference, those thickness values are discarded. A more refined search method can then be applied, within the thickness ranges that have been identified, in order to determine the actual thickness values.

A coarse search method for delimiting layer thickness ranges is disclosed, for example, in U.S. Pat. No. 5,493,401, which also represents the closest existing art. In the model taken as the basis therein, the number m of extremes between two wavelengths $\lambda_s$ and $\lambda_e$, which respectively mark the start and end points of the measured spectrum, are determined using the equation $$m = 4 \sum_{i=1}^{L} (\langle n_i \rangle \times d_i) \times \frac{\lambda_s - \lambda_e}{\lambda_s \lambda_e}. \quad (1)$$

The sum i extends over all layers, $\langle n_i \rangle$ is the average refractive index for that layer within the given wavelength range, and $d_i$ is the layer thickness selected for layer i. The layer thickness is varied for each layer between 0 and an upper limit value $d_{i,max}$, the upper limit value being specified using the formula $$d_{i,max} = \frac{1}{4} \frac{m+1+\gamma}{\langle n_i \rangle} \times \frac{\lambda_s - \lambda_e}{\lambda_s \lambda_e}, \quad (2)$$

where $\epsilon$ designates a safety factor and is indicated as 0.2. Within this range, the layer thicknesses are scanned at constant increments $\Delta d_i$, the increments for each layer being defined as a function of the average refractive index of that layer and the limit wavelengths, using the equation $$\Delta d_i = \frac{0.1}{4 \langle n_i \rangle \times \frac{\lambda_e - \lambda_s}{\lambda_s \lambda_e}}. \quad (3)$$

This method has several disadvantages, however. For example, it is assumed that the measured spectrum can be evaluated within the entire wavelength range. No account is taken of the fact that this may be impossible in some circumstances due to noise and/or an insufficient signal. The limit values for the layer thicknesses are also estimated only very roughly; especially when 0 is set as the lower limit, this results in an unnecessary number of operations that ultimately are discarded. Far more serious, however, is the disadvantage that absorption is not taken into consideration in this method. For this reason, the method can function only with transparent layers; this unnecessarily limits the class of materials that can be investigated, and even in that case the results are reliable only for non dispersive or very weakly dispersive materials, since one and the same refractive index, namely the average $<n_i>$, is used for all wavelengths. This method furthermore fails when fluctuations occur in the reflection spectrum, which can certainly occur with multiple-layer structures and if the angle of incidence of the light onto the specimen is not perpendicular.

SUMMARY OF THE INVENTION

Proceeding from this existing art, it is the object of the invention to improve a method for determining layer thickness ranges in multiple-layer systems, in particular in such a way that not only can the evaluation be more efficient, but also the widest possible spectrum of materials can be investigated.

According to the present invention the object is achieved, by a method comprising the steps of:

generating for each of the layers ($S_i$), the wavelength-dependent refractive index and absorption functions $n_i(\lambda)$ and $k_i(\lambda)$, as well as starting values ($T_i^{min,0}$, $T_i^0$, $T_i^{max,0}$) for a minimum, nominal, and maximum layer thickness;

measuring a reflection spectrum of the specimen in a wavelength range ($\lambda_{min}$, $\lambda_{max}$)

smoothing the reflection spectrum by diminishing noise caused predominantly by external influences and thereby generating a smoothed reflection spectrum;

determining the number of extremes in the smoothed reflection spectrum, wherein two adjacent extremes, of which the one must be a minimum and the other a maximum, being evaluated only if they differ at least by a specified contrast criterion;

determining the layer thickness ranges based on the number of extremes, such that for each layer ($S_i$) the thickness ($T_i$) is varied between ($T_i^{min,0}$) and ($T_i^{max,0}$) in steps having a predetermined increment ($dT_i$), a reflection spectrum being modeled within the wavelength range ($\lambda_{min}$, $\lambda_{max}$), and the number of extremes is determined and stored and compared to the number of extremes in the smoothed reflection spectrum, specifying the wavelength range ($\lambda_{min}$, $\lambda_{max}$) and the increments ($dT_i$) in self-consistent fashion by means of a sensitivity criterion, such that for each layer $S_i$ for a starting increment ($dT_i^0$) and in a wavelength range ($\lambda^0_{min}$, $\lambda^0_{max}$), a reflection modulation spectrum is modeled, the absolute value thereof is determined, and the resulting spectrum is then smoothed;

limiting the wavelength range to a continuous range ($\lambda^i_{min}$, $\lambda^i_{max}$), wherein ($\lambda^i_{min}$) is the smallest and ($\lambda^i_{max}$) is largest wavelength, for which the modeled spectrum still exhibits a value above or equal to a specified threshold value and the modeled spectrum substantially exhibits, for values between those wavelengths, values above the threshold value;

selecting ($\lambda_{min}$) as the minimum of all ($\lambda^i_{min}$), and selecting ($\lambda_{max}$) as the maximum of all ($\lambda^i_{max}$);

calculating the increments ($dT_i$) for the wavelength range ($\lambda_{min}$, $\lambda_{max}$) and are in turn used to model a reflection modulation spectrum for each layer ($S_i$); and repeating until the wavelengths ($\lambda_{min}$) and ($\lambda_{max}$) change, between two repetitions, only by less than a specified self-consistency criterion, in which case the wavelengths ($\lambda_{min}$), ($\lambda_{max}$) and increments ($dT_i$) are used for the further method steps.

The introduction of a sensitivity criterion means that both measurement and evaluation can be confined to a spectral region in which both can still be expected to have usable values. The overall efficiency of the method is thereby increased. A decision as to usability is reached using the modeling of a reflection modulation spectrum. After the specimen has been introduced into the measurement arrangement, however, firstly the data characteristic of the layers $S_i$ are made available. These are the refractive index functions $n_i(\lambda)$ and absorption functions $k_i(\lambda)$, as well as starting values for minimum, nominal, and maximum layer thicknesses for each layer. The starting value to be used for the nominal layer thickness $T_i^0$ is the thickness indicated by the manufacturer for that layer, if such data are available. In principle, however, all other values greater than zero are also possible, since what is initially important is merely to define the wavelength range within which usable measured values, i.e. values substantially different from zero and not noisy, are to be expected. The selection of starting values for minimum and maximum layer thicknesses also depends on whether or not manufacturer data regarding nominal layer thicknesses are available. If they are, it is then possible, for example, to define values approximately 200 nm to 400 nm less than the nominal value for each of the minimum layer thicknesses, and values correspondingly greater than the nominal value for the maximum layer thickness. If no data regarding the nominal values are available, however, it is recommended initially to assume 0 nm for the minimum layer thicknesses and an unrealistically large value, e.g. 2000 or 10000 nm depending on the layer system, for the maximum layer thicknesses. Starting increments $dT_i^0$ must also be specified. These are usually selected in the range from 1 nm to 100 nm, e.g. 10 nm. It is also necessary to define at the outset a wavelength range ($\lambda^0_{min}$, $\lambda^0_{max}$) within which the reflection modulation spectra for each layer are modeled, and which can later be successively restricted. This can be, for example, the largest possible measurement range of the spectrometer in the measurement arrangement. Typical values here are 190 to 800 nm, or 400 to 800 nm. Other wavelength ranges are, of course, also possible.

Prior to measurement of the reflection spectrum, the wavelength range ($\lambda_{min}$, $\lambda_{max}$) and the increments $dT_i$ are then defined. As already indicated above, firstly a reflection modulation spectrum is modeled for each layer. For this, two reflection spectra $R^{model}$ are modeled for each layer being investigated, specifically at layer thicknesses for that layer that are one-half of a starting increment respectively below and above the nominal layer thickness. The layer thicknesses of all other layers are set to their nominal values. These two spectra are then subtracted from one another, yielding the reflection modulation spectrum $dR_i(\lambda)$ for layer $S_i$ being investigated:

$$dR_i(\lambda)=R^{model}(\lambda,T_1^0, \ldots T_i^0+dT_i^0/2, \ldots, T_N^o)- R^{model}(\lambda,T_1^0, \ldots T_i^o-dT_i^0/2, \ldots, T_N^o).$$

The absolute value of the reflection modulation spectrum is then determined. The resulting spectrum is then smoothed using a smoothing function. This can be, for example, convolution using a Gaussian function, or a so-called floating-average smoothing function. The application of a smoothing operation prevents the zero points in the spectrum associated to the absolute-value function from having too great an influence on the next step.

In this step, a new wavelength range and a new increment are determined for that layer. For that purpose, the reflection modulation spectrum is analyzed, in the initially specified wavelength range, as to whether the function values lie above a specified threshold value of, for example $10^{-4}$. In this context, a wavelength $\lambda^i_{min}$ is determined such that all values of the spectrum at wavelengths less than $\lambda^i_{min}$ lie below the threshold, and similarly a value $\lambda^i_{max}$ such that all values of the spectrum for wavelengths greater than $\lambda^i_{max}$ also lie below the threshold value. The range between these two wavelengths should be minimized. Within the range, all values of the spectrum then essentially lie above the threshold value; lower values can still occur only at the zero points, if they were not eliminated by smoothing. It is of course entirely possible in this context for the spectrum to lie above the threshold value within the entire range or at least at one of the limit wavelengths $\lambda^0_{min}$ or $\lambda^0_{max}$, in which case $\lambda^i_{min}$ is set to $\lambda^0_{min}$ and/or $\lambda^i_{max}$ to $\lambda^0_{max}$.

It should be mentioned at this juncture that the technical literature offers, for the modeling of reflection spectra, a number of models that can be used here but that differ in terms of their underlying approximations, for example in terms of whether or not they take absorptions into account, or whether or not they permit dispersive media. It is fundamentally the case that the more general a model, the greater the complexity for modeling a reflection spectrum.

Once a new wavelength range ($\lambda^i_{min}$, $\lambda^i_{max}$) has been determined for all layers $S_i$ (where i=1, . . . , n), the wavelength range ($\lambda_{min}$, $\lambda_{max}$) that is definitive for the next steps is then defined. Here $\lambda_{min}$ is selected as the minimum of all $\lambda^i_{min}$, and $\lambda_{max}$ as the maximum of all $\lambda^i_{max}$. Once a common wavelength range for all layers has been determined, in the next step new increments $dT_i$ are determined for all layers $S_i$ as a function of that wavelength range. This can be accomplished, for example, using a simple model such as the one described in U.S. Pat. No. 5,493,401. Other, more complete models can also be used, however. It is also possible, of course, to use constant increments that are not dependent on the wavelength ranges, but these are then not optimized. Using the recalculated increments $dT_i$, reflection modulation spectra are then modeled again for each layer, and are analyzed in the manner set forth above. A new wavelength range ($\lambda_{min}$, $\lambda_{max}$) is defined, and new increments $dT_i$ are determined as a consequence thereof. This is repeated until wavelengths $\lambda_{min}$, $\lambda_{max}$ change, between two repetitions, only by less than a specified self-consistency criterion, for example 10 nm. Since, in this cycle, the increments are determined by the wavelength range but the wavelength range in turn depends on the increments, self-consistency is achieved when both variables change only within specified tolerances, although only the tolerance, i.e. the self-consistency criterion, is critical here for the wavelength range. When self-consistency is achieved, the wavelength range ($\lambda_{min}$, $\lambda_{max}$) and increments $dT_i$ are used for the further method steps, i.e. the actual analysis.

This is done by subsequently measuring a reflection spectrum of the specimen in the wavelength range just determined, and then smoothing it; this can be accomplished, for example, using the smoothing functions described above. The extremes in the smoothed reflection spectrum are then counted. Two conditions are to be observed here: (i) for two adjacent extremes, one must be a minimum and the other a maximum; and (ii) two adjacent extremes must differ at least by a specified contrast criterion. The result of specifying a contrast criterion is that noise still present after smoothing is further reduced, and that extremes not caused by the layer structure are rejected. The contrast criterion corresponds to a minimum difference in the reflection for each two adjacent extremes corresponding to the condition recited in (i), which must be exceeded in order for an extreme to be selected. For example, it can be required as a contrast criterion that the extremes must differ by at least 4% of the maximum value in the reflection spectrum.

In the last step, a determination is made of the layer thickness ranges based on the number of extremes: for each layer $S_i$, the thickness $T_i$ is varied between the starting values for minimum and maximum layer thickness in steps corresponding to the predetermined increment $dT_i$. a reflection spectrum is modeled within the specified wavelength range for each thickness value, and the number of extremes in each case is determined and stored. What is thereby obtained is the number of extremes as a function of layer thickness. By specifying a number of extremes $\Delta n$ such that the modeled reflection spectrum must have at least that many fewer than the measured reflection spectrum for a minimum layer thickness $T_{i\ min}$, and at least that many more for a maximum layer thickness $T_{i\ max}$, it is possible to determine the layer thickness ranges by comparing the numbers of extremes for the modeled spectra and the measured spectrum. Since a wavelength range and the increments have previously been optimally defined, this method is more efficient and also more reliable than conventional methods.

In an advantageous embodiment of the invention, the increments $dT_i$ in the self-consistency cycle are determined using the formula $$dT_i = \frac{1}{4 Q(\lambda_{max} - \lambda_{min})} \int_{\lambda_{min}}^{\lambda_{max}} \frac{\lambda d\lambda}{\left[n_i(\lambda) - \frac{n_i(\lambda)\sin^2\varphi_{air}}{2(n_i^2(\lambda) + k_i^2(\lambda))}\right]} \qquad (4)$$

in which $\phi_{air}$ is the incidence angle of the radiation for generating the reflection spectrum, the incidence angle being no greater than 15°; and Q is a natural number greater than 1. The advantage as compared, for example, to U.S. Pat. No. 5,493,401 when the increments are determined using this equation is that the investigation can thereby be performed even if the light is not incident perpendicularly onto the specimen, and that even specimens having pronounced absorption characteristics e.g. in the ultraviolet region, as well as highly dispersive specimens, can be more reliably analyzed.

BRIEF DESCRIPTION OF THE DRAWINGS

The invention will be explained below with reference to an exemplary embodiment. In the accompanying drawings.

DETAILED DESCRIPTION OF THE INVENTION

Figure 1:
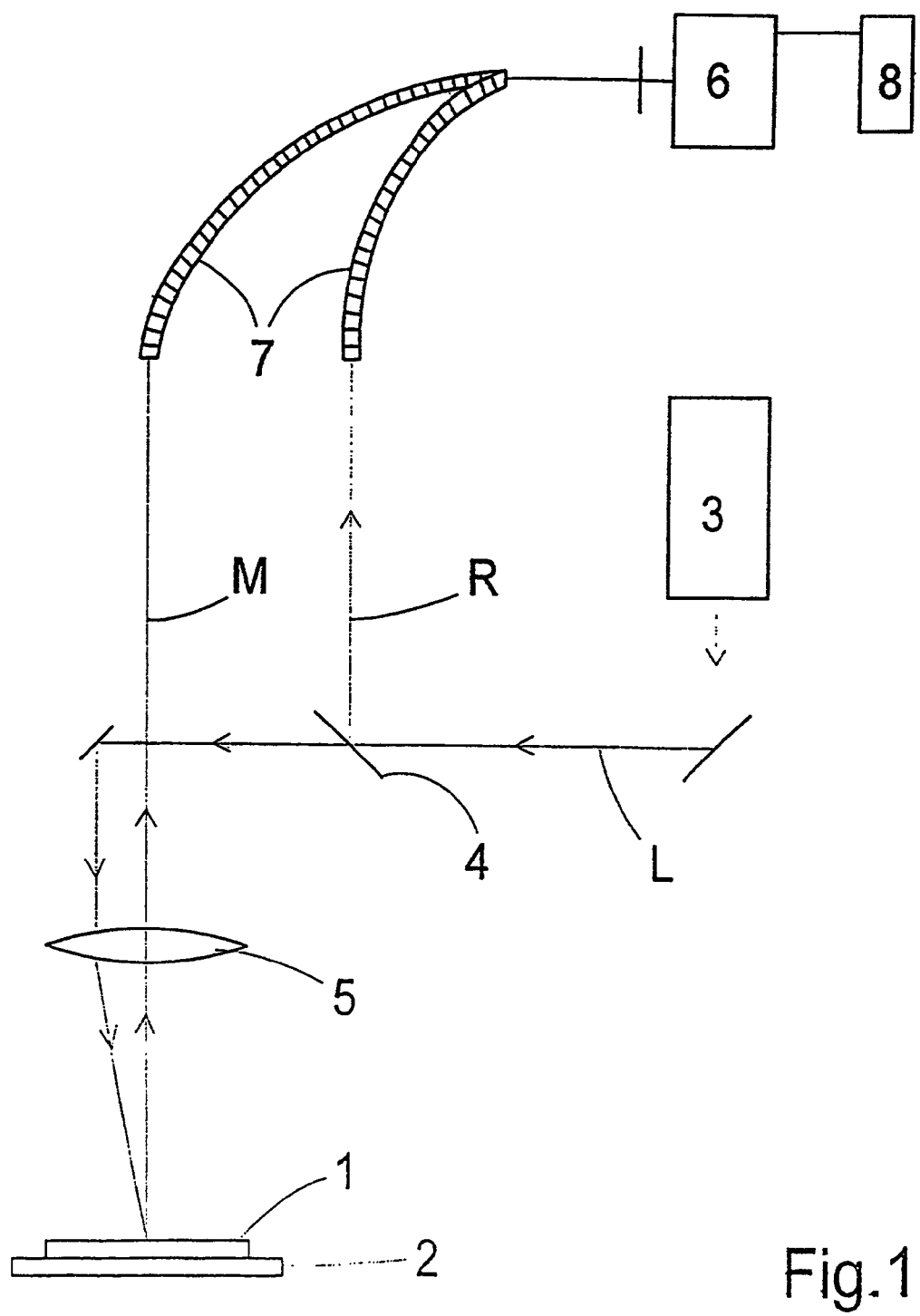
FIG. 1 shows the general configuration of a measurement arrangement with specimen.

FIG. 1 depicts one possible arrangement that can be used in principle for layer thickness determination, and is described in the existing art e.g. in German Patent DE 100 21 379 A1. A specimen 1, e.g. a wafer, is introduced into the measurement system. In FIG. 1, specimen 1 is secured in a mount 2. A light beam L proceeds from a light source 3 and is split by a beam splitter 4 into a reference beam R and a measurement beam M. Specimen 1 is illuminated with measurement beam M through an objective 5. The arrows and lines are intended to illustrate the light path. A white-light source can, for example, serve as light source 3, but coherent light sources such as tunable-wavelength lasers are also possible. Light sources which emit wavelengths in the optical region that cannot be recorded directly by the eye are also included. Using beam splitter 4, it is possible to record in a receiving unit 6 on the one hand the direct signal of the light source and on the other hand the light reflected from specimen 1. Reference light beam R and measurement light beam M can be coupled into receiving unit 6, for example, using light-guiding device 7. In receiving unit 6, the light is spectrally subdivided (if several wavelengths are proceeding simultaneously from light source 3), and the intensities of the directly incident light and the reflected light are recorded for each measured wavelength. Receiving unit 6 is connected to an evaluation unit 8 which can be, for example, a commercially available home computer.

Figure 2:
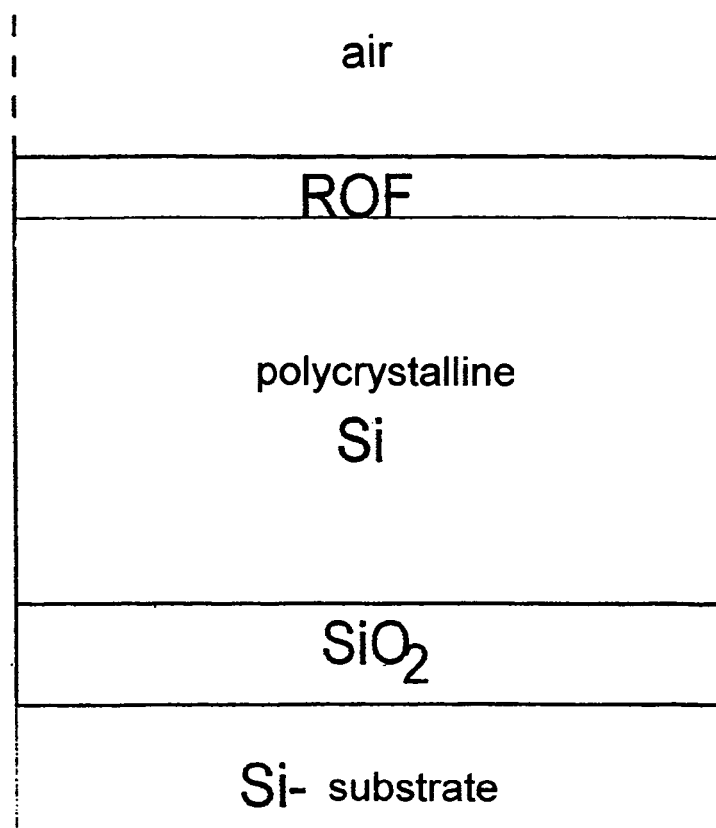
FIG. 2 shows a model of a specimen.

The specimen can be, for example, a layer system such as the one sketched in FIG. 2. Applied onto a silicon substrate is a thin silicon dioxide layer, and on that is a thicker layer of polycrystalline silicon. The latter is delimited, in the transition region to the air layer, by a rough surface (ROF). The rough surface can be modeled using a so-called effective medium approximation model as defined by Bruggemann, described on page 90 of "Spectroscopic ellipsometry and reflectometry" by Harland G. Tomkins, published by J. Wiley & Sons, 1990. Since in this layer stack the absorbing polycrystalline silicon layer is located above the dielectric oxide layer, it is to be expected that the reflection spectrum will be damped in the direction of higher energies, i.e. shorter wavelengths.

Once specimen 1 has been introduced into the measurement arrangement, the parameters specific to the silicon dioxide layer and the layer of polycrystalline silicon whose layer thickness ranges are to be determined (i.e. refractive index and adsorption functions, as well as starting values for minimum, nominal, and maximum layer thickness) are made available in evaluation unit 8, for example by input via a keyboard. In this case, the nominal layer thicknesses are 395 nm for the layer of polycrystalline silicon and 20 nm for the layer of silicon dioxide. A thickness of 8.5 nm is assumed in the model for the layer labeled ROF in FIG. 2.

Figure 3:
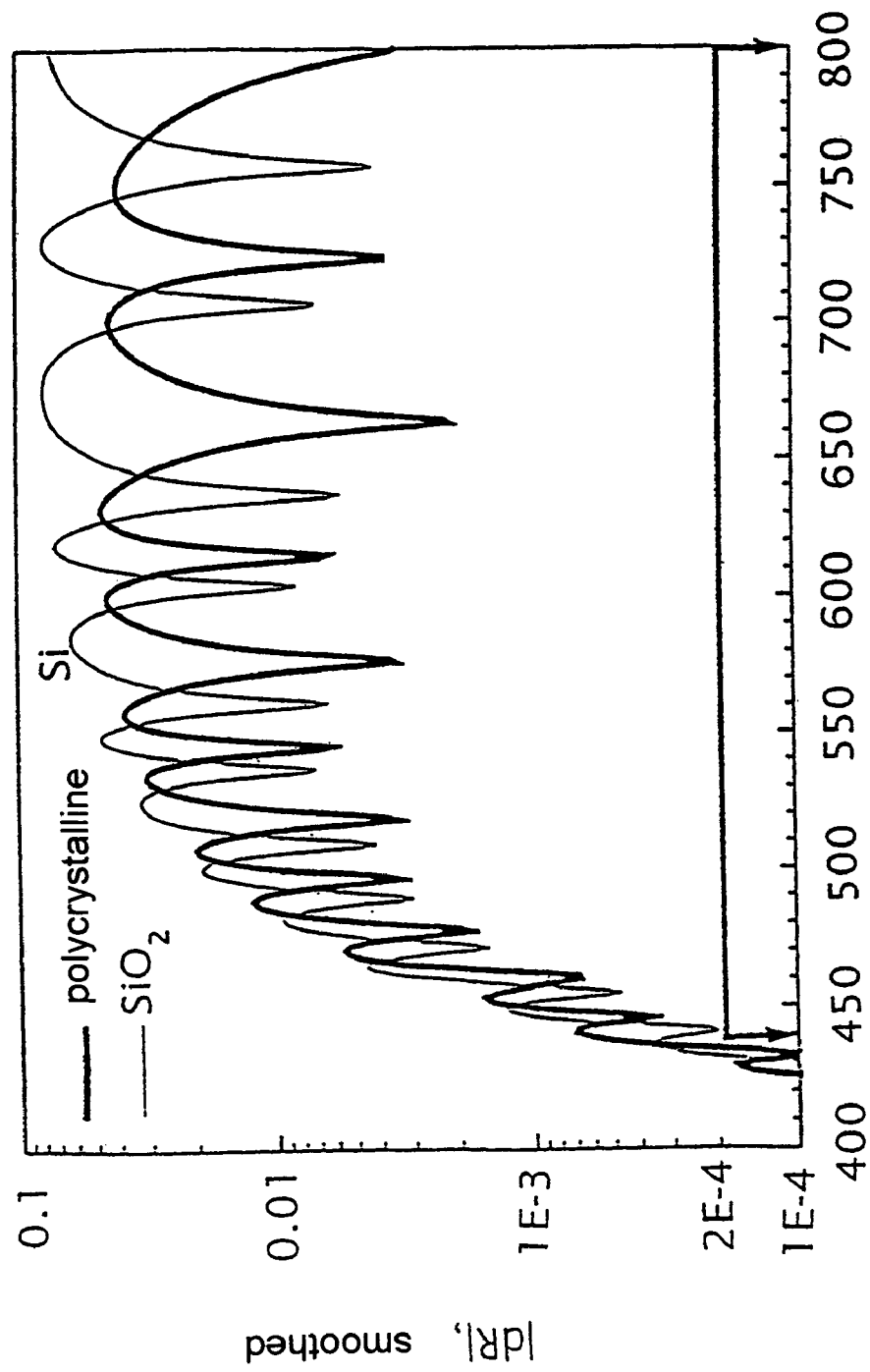
FIG. 3 shows the smoothed absolute value of a differential reflection spectrum for the specimen shown in FIG. 2.

In the next step, the wavelength range and the increments are to be determined in self-consistent fashion. Using starting increments of 10 nm in each case, and an initial wavelength range between 400 and 800 nm, reflection spectra are modeled for each of the layers at intervals of +/−5 nm in each case around the nominal layer thickness, the reflection modulation spectra are calculated therefrom, the latter are combined using the absolute-value function, and then the resulting spectrum is smoothed. Once the self-consistency loop has been run through several times and the self-consistency criterion has been achieved, smoothed reflection modulation spectra such as those depicted in FIG. 3 are obtained for the two layers. With a threshold value of $2*10^{-4}$, $\lambda_{min}$ is found to be 440 nm. At the upper end of the wavelength range taken into consideration, the values of the smoothed reflection modulation spectrum lie above the sensitivity criterion, and the upper limit of 800 nm is therefore set equal to $\lambda_{max}$. If, for example, the aforementioned equation (4) is then applied in order to determine the increments, the result is an increment of 13.03 nm for silicon dioxide and an increment of 4.83 nm for the layer of polycrystalline silicon.

Within the wavelength range predetermined in this fashion, the reflection spectrum of the specimen is then measured and smoothed, and then the number of extremes in the smoothed reflection spectrum is determined on the basis of the conditions described above. If it is required as a contrast criterion that the extremes must differ by at least 4% of the maximum value in the reflection spectrum, what is obtained as the number of extremes in the measured reflection spectrum $N_{exp}$ is therefore a value of 8.

Figure 4:
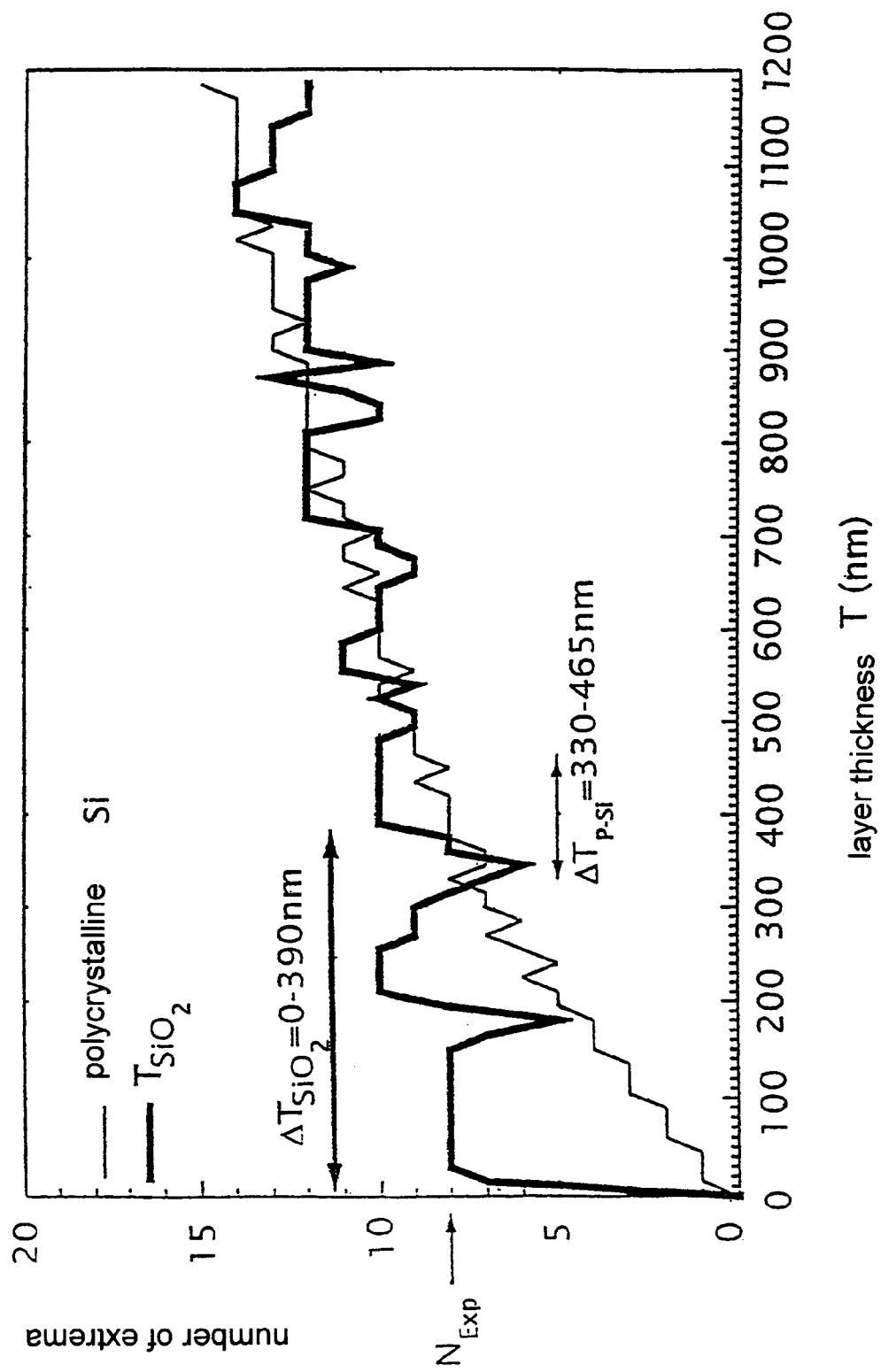
FIG. 4 shows the number of extremes as a function of layer thickness, and the delimitation of the layer thickness range to be investigated, for the specimen shown in FIG. 2.

Reflection spectra are then modeled for each of the layers between the starting values for minimum and maximum layer thicknesses, in each case at intervals corresponding to the previously determined increments, and the number of extremes is determined. While the thickness range of one of the layers is being scanned, the other layer thicknesses are maintained at their nominal values. The result for the specimen shown in FIG. 2 is depicted in FIG. 4. Here, the starting values assumed for the minimum and maximum layer thicknesses were 0 and 1200 nm, respectively, for both the polycrystalline silicon and the silicon dioxide layer. As the layer thickness for polycrystalline silicon was varied (shown with a thin line in FIG. 4), the layer thickness of the silicon dioxide layer was maintained at the nominal value of 20 nm. As the thickness of the silicon dioxide layer was varied, on the other hand, the layer thickness of the polycrystalline silicon layer was maintained at the nominal value of 395 nm. In order now to narrow down the range of possible layer thicknesses to a smaller range, and in order to be as certain as possible that the actual layer thicknesses lie within those ranges, a number $\Delta N$ is defined by which the respective layer thicknesses must, at least, differ at the range limits. At the same time, however, the range should be kept as small as possible. $\Delta N$ is usually selected to be in the vicinity of approx. 10% of the total number of extremes in the experimental spectrum, i.e. in this case approximately 1. The result is to yield the thickness ranges labeled with double-ended arrows in FIG. 4, namely a thickness range $\Delta T_{SiO2}$ of between 0 and 390 nm for the silicon dioxide layer, and a thickness range $\Delta T_{P-Si}$ of from 330 to 465 nm for the layer of polycrystalline silicon. The determination of the actual layer thicknesses can then be performed in these ranges using a more precise and more laborious search method.

What is claimed is:

1. A method for determining layer thickness ranges of a plurality of layers ($S_i$) of a specimen, the method comprises the steps of:
   generating for each of the layers ($S_i$), the wavelength-dependent refractive index and absorption functions $n_i(\lambda)$ and $k_i(\lambda)$, as well as starting values ($T_i^{min,0}$, $T_i^0$, $T_i^{max,0}$) for a minimum, nominal, and maximum layer thickness;
   measuring a reflection spectrum of the specimen in a wavelength range ($\lambda_{min}$, $\lambda_{max}$)
   smoothing the reflection spectrum by diminishing noise caused predominantly by external influences and thereby generating a smoothed reflection spectrum;
   determining the number of extremes in the smoothed reflection spectrum, wherein two adjacent extremes, of which the one must be a minimum and the other a maximum, being evaluated only if they differ at least by a specified contrast criterion;
   determining the layer thickness ranges based on the number of extremes, such that for each layer ($S_i$) the thickness ($T_i$) is varied between ($T_i^{min,0}$) and ($T_i^{max,0}$) in steps having a predetermined increment ($dT_i$), a reflection spectrum being modeled within the wavelength range ($\lambda_{min}$, $\lambda_{max}$), and the number of extremes is determined and stored and compared to the number of extremes in the smoothed reflection spectrum, specifying the wavelength range ($\lambda_{min}$, $\lambda_{max}$) and the increments ($dT_i$) in self-consistent fashion by means of a sensitivity criterion, such that for each layer $S_i$ for a starting increment ($dT_i^0$) and in a wavelength range ($\lambda^0_{min}$, $\lambda^0_{max}$), a reflection modulation spectrum is modeled, the absolute value thereof is determined, and the resulting spectrum is then smoothed;

limiting the wavelength range to a continuous range ($\lambda^i_{min}$, $\lambda^i_{max}$), wherein ($\lambda^i_{min}$) is the smallest and ($\lambda^i_{max}$) is largest wavelength, for which the modeled spectrum still exhibits a value above or equal to a specified threshold value and the modeled spectrum substantially exhibits, for values between those wavelengths, values above the threshold value;

selecting ($\lambda_{min}$) as the minimum of all ($\lambda^i_{min}$), and selecting ($\lambda_{max}$) as the maximum of all ($\lambda^i_{max}$);

calculating the increments ($dT_i$) for the wavelength range ($\lambda_{min}$, $\lambda_{max}$) and are in turn used to model a reflection modulation spectrum for each layer ($S_i$); and repeating until the wavelengths ($\lambda_{min}$) and ($\lambda_{max}$) change, between two repetitions, only by less than a specified self-consistency criterion, in which case the wavelengths ($\lambda_{min}$), ($\lambda_{max}$) and increments ($dT_i$) are used for the further method steps.

2. The method as defined in claim 1, wherein the increments ($dT_i$) are determined using the formula $$dT_i = \frac{1}{4Q(\lambda_{max} - \lambda_{min})} \int_{\lambda_{min}}^{\lambda_{max}} \frac{\lambda d\lambda}{\left[ n_i(\lambda) - \frac{n_i(\lambda)\sin^2\varphi_{air}}{2(n_i^2(\lambda) + k_i^2(\lambda))} \right]}$$

in which $\phi_{air}$ is the incidence angle of the radiation for generating the reflection spectrum, $\phi_{air}$ is no greater than 15°, and Q is a natural number greater than 1.

* * * * *